US012601193B2

(12) United States Patent
Zhou

(10) Patent No.: US 12,601,193 B2
(45) Date of Patent: Apr. 14, 2026

(54) AUTOMATIC APPARATUS FOR INSTALLING GOODS DELIVERY TERMINAL

(71) Applicant: Pengyue Zhou, Shenzhen (CN)

(72) Inventor: Pengyue Zhou, Shenzhen (CN)

( * ) Notice: Subject to any disclaimer, the term of this patent is extended or adjusted under 35 U.S.C. 154(b) by 281 days.

(21) Appl. No.: 18/120,474

(22) Filed: Mar. 13, 2023

(65) Prior Publication Data

US 2023/0220691 A1     Jul. 13, 2023

Related U.S. Application Data

(63) Continuation of application No. PCT/CN2021/000184, filed on Sep. 13, 2021.

(30) Foreign Application Priority Data

Sep. 11, 2020    (CN) .......................... 202010970119.7
Sep. 11, 2020    (CN) .......................... 202010970120.X

(51) Int. Cl.
*E04G 21/16*         (2006.01)
*B64U 70/90*        (2023.01)
              (Continued)

(52) U.S. Cl.
CPC ........... *E04G 21/163* (2013.01); *B64U 70/90* (2023.01); *B65G 61/00* (2013.01); *B64U 2101/60* (2023.01); *B65G 2203/0216* (2013.01)

(58) Field of Classification Search
CPC .. E04G 21/163; B64U 70/90; B64U 2101/60; B65G 61/00; B65G 2203/0216; B23P 19/06
See application file for complete search history.

(56) References Cited

U.S. PATENT DOCUMENTS 8,673,189 B2 *   3/2014   Schwoerer .............. E04G 11/28
                                                              249/20
9,995,047 B2 *   6/2018   Raman ................. G05D 1/0214
                              (Continued)

FOREIGN PATENT DOCUMENTS

CN          102601782 A      7/2012
CN          107487736 A     12/2017
                      (Continued)

*Primary Examiner* — Lynn E Schwenning

(57)                  ABSTRACT
An automatic apparatus used for installing a goods delivery terminal comprising a plurality of transporting modules, the transporting module is provided with a first guide rail. The automatic apparatus comprises a sliding assembly. After the transporting modules are joined and installed, the sliding assembly can slide upwards or downwards along the first guide rails from a side of one transporting module to a side of another transporting module. The automatic apparatus further comprises a holding component, a moving mechanism and an operating assembly. The holding component is used for holding the transporting module. After the sliding assembly slides to a position at or near the top portion of installed transporting module, the moving mechanism is used for moving the transporting module to be installed to a position directly above the installed transporting module. The operating assembly is used for enabling and/or disabling fixed connection of the adjacent transporting modules.

20 Claims, 9 Drawing Sheets

(51) Int. Cl.
    *B65G 61/00*      (2006.01)
    *B64U 101/60*     (2023.01)

(56)           References Cited

U.S. PATENT DOCUMENTS

| | | | |
|---|---|---|---|
| 2010/0038518 A1* | 2/2010 | Schwoerer | E04G 11/28 |
| | | | 249/20 |
| 2010/0057242 A1* | 3/2010 | Williams | B27F 7/006 |
| | | | 700/114 |
| 2013/0067829 A1 | 3/2013 | Johnstone | |
| 2015/0129359 A1* | 5/2015 | Urzelai Ezkibel | E04G 11/28 |
| | | | 182/82 |
| 2020/0165105 A1* | 5/2020 | Zhao | E04G 3/28 |
| 2020/0178717 A1* | 6/2020 | Gil | B64U 10/14 |
| 2020/0407079 A1* | 12/2020 | Kim | H02J 50/90 |

FOREIGN PATENT DOCUMENTS

| | | | | |
|---|---|---|---|---|
| CN | 107738364 | * | 2/2018 | B28D 1/14 |
| CN | 207566490 U | | 7/2018 | |
| CN | 109849013 A | | 6/2019 | |
| CN | 110539996 A | | 12/2019 | |
| CN | 209796835 U | | 12/2019 | |
| CN | 110980081 | * | 4/2020 | B65G 1/04 |
| CN | 210704851 U | | 6/2020 | |
| JP | H0524607 A | | 2/1993 | |
| JP | 2007145561 A | | 6/2007 | |

* cited by examiner

AUTOMATIC APPARATUS FOR INSTALLING GOODS DELIVERY TERMINAL

CROSS REFERENCE TO RELATED APPLICATIONS

The present disclosure is a continuation application of the international application No. PCT/CN2021/000184 filed on Sep. 13, 2021, which claims priority from the Chinese patent application Nos. 202010970120.X and 202010970119.7, both entitled "Automatic Apparatus for Installing Goods Delivery Terminal", filed on Sep. 11, 2020, and the entire content of which are hereby incorporated by reference.

TECHNICAL FIELD

The present disclosure belongs to the technical field of intelligent logistics, and particularly relates to automatic apparatus for installing goods delivery terminal.

BACKGROUND

The goods delivery terminal in a UAV (unmanned aerial vehicle) express application is an automated equipment that cooperates with the UAV to deliver goods in the first or last mile. The goods are transferred via the goods delivery terminal between a user and the UAV. The goods delivery terminal is composed of a plurality of modules, including a transporting module used for transporting goods.

A type of the goods delivery terminal (a first goods delivery terminal) comprises the transporting module, at least one transporting module may be arranged on the ceiling of a storey in a multi-storey building. A facility used for the UAV to load/offload the goods is arranged on the exterior wall of the same storey, the transporting module can transport the goods between the facility and the indoor designated area, enabling a user to access the goods when staying inside the building. However, if the transporting module is installed by manual work, it is necessary for a worker to carry out installation work at a height far away from the floor, making the installation work difficult, which requires long installation period and high cost, especially for mass deployment of the second goods delivery terminals.

Another type of the goods delivery terminal (a second goods delivery terminal) comprises a plurality of the transporting modules, the plurality of the transporting modules are capable of being joined and installed from the bottom up. The second goods delivery terminal may be arranged on the exterior wall of a multi-storey building so as to transport the goods between an area near the ground and an area near the top portion of the building. The second goods delivery terminal may be further used for the UAV to load/offload goods onto the top of the second goods delivery terminal. If the plurality of the transporting modules are joined and installed by manual work, it is necessary to erect scaffolds for the worker or to use a large lifting equipment, which also requires long installation period and high cost, especially for mass deployment of the second goods delivery terminals.

SUMMARY

As such, the present disclosure proposes an automatic apparatus for installing the first goods delivery terminal.

Further, the present disclosure proposes another automatic apparatus for installing the second goods delivery terminal.

A first automatic apparatus is used for installing the first goods delivery terminal. The first goods delivery terminal comprises at least one first transporting module used for transporting goods and capable of being arranged on ceiling. The first automatic apparatus comprises an automated guided vehicle, a holding assembly, a lifting mechanism and an operating assembly. Wherein, at least part of the holding assembly may be positioned directly above the automatic guide vehicle, and the holding assembly is used for holding the first transporting module to be installed. The lifting mechanism connects the automatic guide vehicle and the holding assembly. The lifting mechanism is used for lifting the holding assembly up and down relative to the automatic guide vehicle, so as to lift the first transporting module held by the holding assembly up until the first transporting module is near or touching the ceiling, and to lift the holding assembly down until the holding assembly is near the automatic guide vehicle respectively. The first automatic apparatus can move the first transporting module held by the holding assembly to an installation position via the automatic guide vehicle and the lifting mechanism. The operating assembly is arranged on the holding assembly or the lifting mechanism, and is used for enabling and/or disabling fixed connection of the first transporting module and the ceiling.

A second automatic apparatus used for installing the second goods delivery terminal, the second goods delivery terminal comprising a plurality of third transporting modules used for transporting goods, which are capable of being joined and installed from the bottom up, the third transporting module is provided with a first guide rail. Wherein, the second automatic apparatus comprises a sliding assembly. After a plurality of the third transporting modules are joined and installed, the sliding assembly can slide upwards or downwards along the first guide rails of the plurality of the third transporting modules from a side of one of the third transporting modules to a side of another of the third transporting modules. The second automatic apparatus further comprises a holding component, a moving mechanism arranged on the sliding assembly, and an operating assembly arranged on the sliding assembly or on the holding component or on the moving mechanism. At least part of the holding component is capable of being positioned above the sliding assembly, and the holding component is used for holding the third transporting module to be installed. After the sliding assembly slides to a position at or near the top portion of the installed third transporting module, the moving mechanism is used for moving the third transporting module to be installed to a position directly above the installed third transporting module. The operating assembly is used for enabling and/or disabling fixed connection of the adjacent third transporting modules.

Details of one or more embodiments of the invention are provided in the following drawings and description. Other features, objects and advantages of the invention will become obvious from the description, the drawings and the claims.

BRIEF DESCRIPTION OF DRAWINGS

To better explain the embodiments of the present disclosure or the technical solutions of the prior art, the following will briefly introduce the drawings involved in the description of the embodiments or the prior art. It is obvious that the drawings in the following description are only some embodiments of the invention. For persons skilled in the art, the drawings of other embodiments can be obtained from these drawings without paying creative work.

DETAILED DESCRIPTION OF THE EMBODIMENTS

In order to help understanding of the present disclosure, the present disclosure will be described more comprehensively hereinafter with reference to the relevant accompanying drawings.

Embodiment 1

Figure 1:
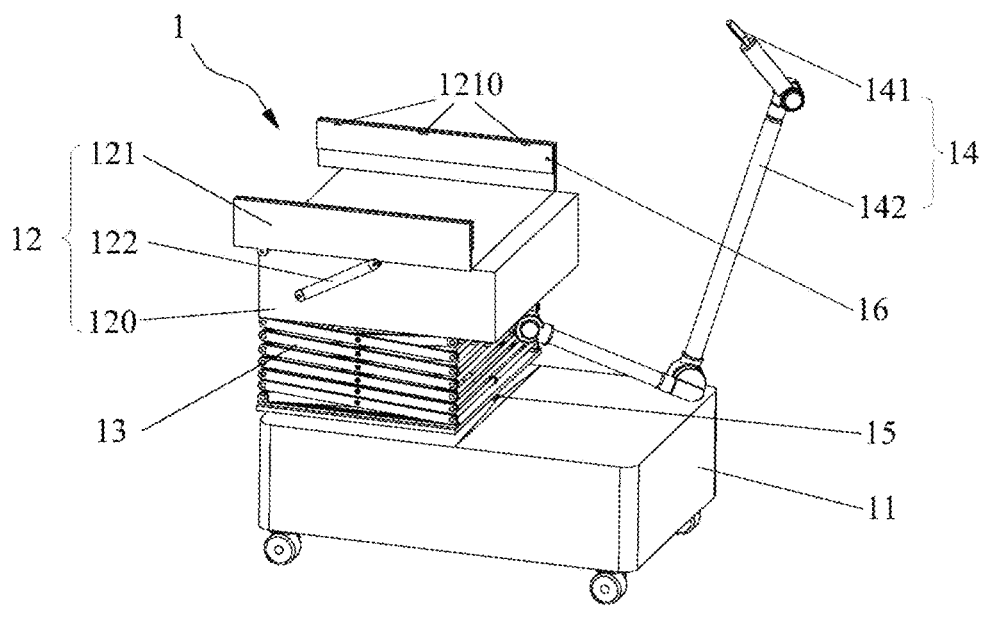
FIG. 1 is a schematic diagram of a first automatic apparatus according to Embodiment 1 of the present disclosure.
Figure 2:
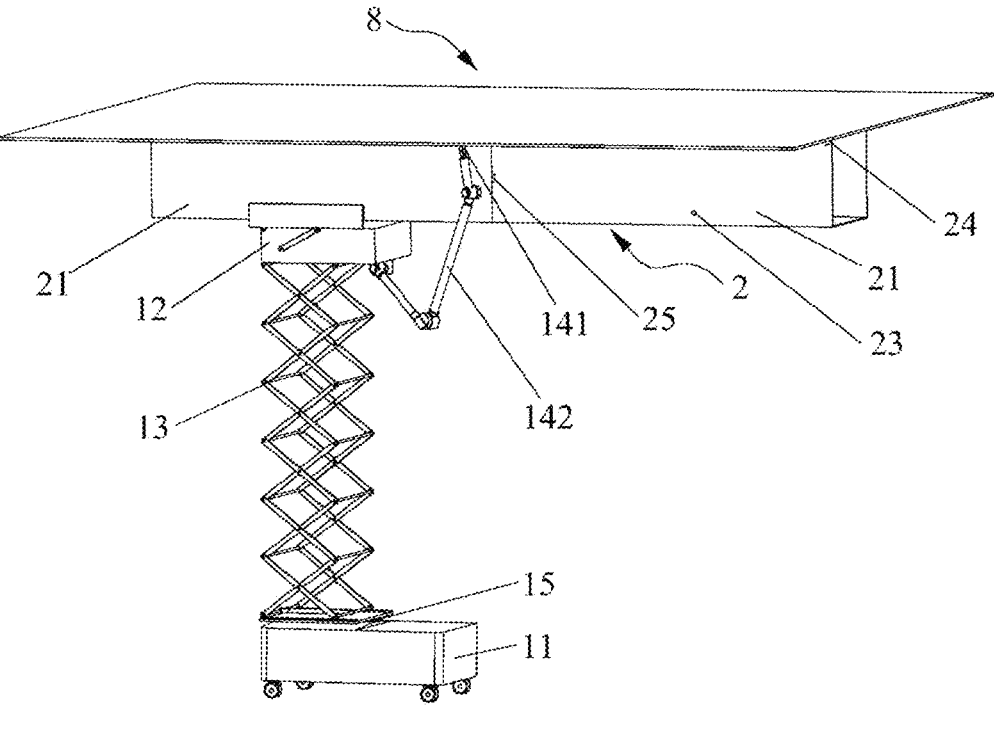
FIG. 2 is a schematic diagram of the first automatic apparatus shown in FIG. 1 enabling fixed connection of a first transporting module and ceiling, and enabling fixed connection of adjacent first transporting modules.

Referring to FIGS. 1-2, a first automatic apparatus 1 is used for installing a first goods delivery terminal applied in intelligent logistics. The first goods delivery terminal comprises at least one first transporting module used for transporting goods and capable of being arranged on ceiling. The first automatic apparatus comprises an automated guided vehicle 11, a holding assembly 12, a lifting mechanism 13 and an operating assembly 14. Wherein, at least part of the holding assembly 12 may be positioned directly above the automatic guide vehicle 11, and the holding assembly 12 is used for holding the first transporting module 21 to be installed. The lifting mechanism 13 connects the automatic guide vehicle 11 and the holding assembly 12. The lifting mechanism 13 is used for lifting the holding assembly 12 relative to the automatic guide vehicle 11, so as to lift the first transporting module 21 held by the holding assembly 12 until the first transporting module 21 is near or touching the ceiling 8, and the lifting mechanism 13 is further used for lowering the holding assembly 12 relative to the automatic guide vehicle 11, so as to lower the holding assembly 12 until the holding assembly 12 is near the automatic guide vehicle 11. The first automatic apparatus 1 can move the first transporting module 21 held by the holding assembly 12 to the installation position via the automatic guide vehicle 11 and the lifting mechanism 13. The operating assembly 14 is arranged on the holding assembly 12 and is used for enabling and/or disabling fixed connection of the first transporting module 21 and the ceiling 8.

Specifically, the automatic guide vehicle 11 is capable of moving automatically. The automatic guide vehicle 11 comprises a sensor such as a camera, which assists the automatic guide vehicle 11 to navigate to the designated area, alternatively, the automatic guide vehicle 11 may be remotely controlled by an operator. The automatic guidance vehicle 11 further comprises a battery, or a cable used for connecting the indoor power source so as to supply power for the first automatic apparatus 1.

The holding assembly 12 is provided with a securing piece 1210 used for securing the first transporting module 21 relative to the holding assembly 12. The securing piece 1210 may be an electromagnet, correspondingly, the shell of the first transporting module 21 is made of metal which can be attracted by the electromagnet. Alternatively, the securing piece 1210 may be other structure, such as a vacuum sucker that can attract the first transporting module 21, or a protrusion that can be inserted into the first transporting module 21. Optionally, when the holding assembly 12 holds the first transporting module 21, the first transporting module 21 may be positioned at the top portion of the holding assembly 12.

The lifting mechanism 13 can automatically extend or contract, so as to adjust the height of the holding assembly 12 relative to the automatic guide vehicle 11. Optionally, the lifting mechanism 13 comprises a scissor mechanism and an actuator used for driving the scissor mechanism to extend or contract. The holding assembly 12 is arranged at the top portion of the scissor mechanism. A direction in which a slider of the scissor mechanism 13 slides may be parallel with the lengthwise direction of the automatic guide vehicle 11. The lifting mechanism 13 may take other structure, such as a foldable arm or a telescopic arm.

The operating assembly 14 comprises an operating unit 141 and a robotic arm 142. The operating unit 141 is used for enabling the fixed connection of the first transporting module 21 and the ceiling 8. For example, if an expansion bolt 24 is used for fixing the first transporting module 21 to the ceiling 8, correspondingly, the operating unit 141 is used for drilling a hole in the ceiling 8 and installing the expansion bolt 24 into the hole; alternatively, if the first transporting module 21 is fixedly connected with the ceiling 8 by bonding, the operating unit 141 is used for spraying adhesive. Optionally, the first transporting module 21 includes a ceiling mount (not shown in the figure), the ceiling mount may be a support hanger pre-installed on the main structure of the first transporting module 21, the operating assembly 14 is capable of enabling fixed connection of the support hanger and the ceiling 8; alternatively, the first transporting module 21 does not include the support hanger, the support hanger may be pre-installed on the ceiling 8, the operating assembly 14 is capable of enabling fixed connection of the first transporting module 21 and the support hanger. The robotic arm 142 enables the operating unit 141 to move in wider range. It is understandable that the robotic arm 142 can expand the movement range of the operating unit 141 by increasing the number of links or the length of link, so that the operating unit 141 can work in an area far away from the holding assembly 12. Further, a sensor such as a camera may be arranged at the end portion of the robotic arm 142 to assist operation of the operating assembly 14.

In the illustrated implementation, one robotic arm 142 is connected with the bottom of the holding assembly 12. Alternatively, at least two robotic arms 142 may be arranged at two opposite sides of the holding assembly 12 respectively, enabling the two operating units 141 to respectively move in two different spaces at the same time, which helps improving the operation efficiency of the operating assembly 14, and lowering the link number or the link length of each robotic arm 142.

In another implementation, the operating assembly 14 may be arranged on the lifting mechanism 13, for example, the operating assembly 14 and the holding assembly 12 are both arranged on the top portion of the lifting mechanism 13. Optionally, the operating unit 141 is detachable from the robotic arm 142, and is provided with various types used for operation such as drilling, installing screw, etc. The different types of the operating unit 141 may be respectively arranged on the robotic arm 142 according to operation tasks.

It should be noted that the operating assembly 14 is not limited to the robotic arm assembly. For example, in another implementation, the operating assembly 14 comprises the operating unit 141 and a connecting member used for connecting the operating unit 141 and the holding assembly 12. The connecting member is immovable relative to the holding assembly 12.

In one implementation, before the first automatic apparatus 1 installs the first transporting module 21, one first transporting module 21 to be installed is loaded onto the holding assembly 12 by manual work or an external equipment, and is held by the holding assembly 12. Afterwards, the automatic guide vehicle 11 moves to a position directly below the installation position of the first transporting module 21, subsequently, the lifting mechanism 13 lifts the holding assembly 12 relative to the automatic guide vehicle 11 until the first transporting module 21 held by the holding assembly 12 is near or touching the ceiling 8, that is, until the first transporting module 21 held by the holding assembly 12 is positioned at the installation position. After the operating assembly 14 fixes the first transporting module 21 held by the first automatic apparatus 1 to the ceiling 8, the holding assembly 12 release the first transporting module 21, and lowers down via the lifting mechanism 13 until the holding assembly 12 is near the automatic guide vehicle 11, in order to receive the next first transporting module 21 to be installed.

In another implementation, the first automatic apparatus 1 moves the first transporting module 21 held by the holding assembly 12 to the installation position via the automatic guide vehicle 11 and the lifting mechanism 13, enabling the first transporting module 21 to be fixedly connected with the ceiling 8. For example, the first transporting module 21 and the ceiling mount are fixedly connected by means of a quick attach mount such as engagement of a snap-fit joint and a snap-fit groove, the ceiling mount is pre-installed on the ceiling 8, the first automatic apparatus 1 moves the first transporting module 21 held by the holding assembly 12 to the installation position via the automatic guide vehicle 11 and the lifting mechanism 13, meanwhile making the snap-fit joint on one of the first transporting module 21 and the ceiling mount engage with the snap-fit groove on the other, thereby enabling the fixed connection of the first transporting module 21 and the ceiling mount. In this case, the first automatic apparatus 1 may not comprise the operating assembly 14, alternatively, the operating assembly 14 may be merely used for disabling the fixed connection of the first transporting module 21 and the ceiling 8, for example, may be merely used for disengaging the snap-fit joint and the snap-fit groove.

The first automatic apparatus 1 can automatically install the first transporting module 21 on the ceiling 8, dispensing with at least part of the manual work, which helps decreasing period and cost of installing the first goods delivery terminal 2, and helps massively deploying the first goods delivery terminals 2.

Referring to FIG. 2 again. The first automatic apparatus 1 can install a plurality of the first transporting modules 21 along a first direction onto the ceiling 8 with joining those first transporting modules 21, in order to increase a distance that the first transporting module 21 transports the goods in the first direction, wherein the first direction may be horizontal. Specifically, after the plurality of the first transporting modules 21 are fixed to the ceiling, the operating assembly 14 is further used for enabling fixed connection 25 of the adjacent ones of the first transporting modules 21. The adjacent first transporting modules 21 may be fixedly connected by bolt 25 or adhesive, correspondingly, the operating unit 141 may be an electric screwdriver used for installing bolt 25 or an adhesive gun used for spraying adhesive. Alternatively, the adjacent first transporting modules 21 may be fixedly connected by other methods, for example, may be fixedly connected by a quick connect structure. Specifically, the quick connect structure comprises an action piece, and a locking piece which is connected with the action piece and is configured to be moved by the action piece. Wherein, at least part of the action piece is exposed, allowing the action piece to move when the action piece is subjected to force acted by the first automatic apparatus 1, making the action piece drive the locking piece to move, so as to enable or disable the fixed connection of the adjacent first transporting modules 21. The locking piece may be a latch, a hook, a pin or the like, the action piece may be a handle, a dial or the like. The locking piece and the action piece may be connected by a rod, a gear set, a steel wire or the like, alternatively, the locking piece and the action piece may be connected directly. In this case, the operating unit 141 may take any structure that can act the force properly on the action piece.

It should be noted that, in another implementation, before fixing the first transporting module 21 held by the holding assembly 12 to the ceiling 8, the operating assembly 14 may enable the fixed connection of this first transporting module 21 and another first transporting module 21 which is already installed on the ceiling 8. The holding assembly 12 may keep holding the first transporting module 21 until the operating assembly 14 completes fixing the first transporting module 21 to the ceiling 8. Or, the adjacent first transporting modules 21 may be fixedly connected via the quick connect structure such as the snap-fit joint and the snap-fit groove, in this case, the operating assembly 14 may be omitted, alternatively, the operating assembly 14 may be merely used for disabling the fixed connection of the adjacent first transporting modules 21.

Optionally, the automatic guide vehicle 11 is provided with omni-directional wheel sets, allowing the automatic guide vehicle 11 to adjust a position and an orientation of the first transporting module 21 held by the holding assembly 12 more flexibly.

Figure 3:
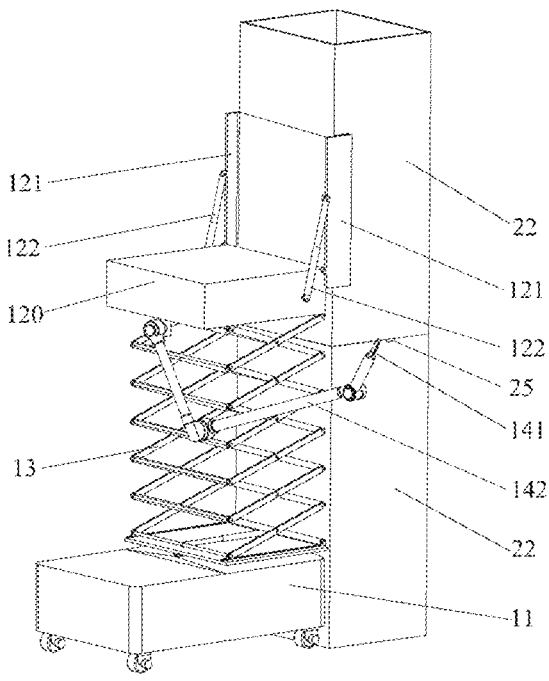
FIG. 3 is a schematic diagram of the first automatic apparatus shown in FIG. 1 enabling fixed connection of adjacent second transporting modules.

Optionally, referring to FIG. 3. The holding assembly 12 comprises a lifting base 120 connected with the lifting mechanism 13, and a holding component 121 used for holding the first transporting module 21. The holding component 121 can rotate relative to the lifting base 120. After rotation of the holding component 121, part of or whole of the holding component 121 may be positioned diagonally above the automatic guide vehicle 11 or at a side of the automatic guide vehicle 11. Wherein, the holding component 121 is provided with the securing piece 1210, the operating assembly 14 may be arranged on the lifting base 120 or the holding component 121, and the holding assembly 12 further comprises an actuating mechanism 122 used for driving the holding component 121 to rotate relative to the lifting base 120. In the illustrated implementation, the holding component 121 can rotate about a first rotating shaft relative to the lifting base 120, wherein the first rotating shaft may be arranged along the widthwise direction of the automatic guide vehicle 11, the actuating mechanism 122 is a telescopic rod, two ends of the telescopic rod are connected to the lifting base 120 and the holding component 121 respectively, and the telescopic rod extends or contracts to make the holding component 121 rotate relative to the lifting base 120. The actuating mechanism 122 is not limited to the telescopic rod, for example, the actuating mechanism 122 may be a motor arranged at the first rotating shaft, which drives the holding component 121 to rotate relative to the lifting base 120.

The holding component 121 rotates relative to the lifting base 120, enabling the holding component 121 to automatically hold the first transporting module 21, which is placed on the floor and is in a vertical posture, when the holding assembly 12 is near the automatic guiding vehicle 11. After the holding component 121 holds the first transporting module 21, the holding component 121 is configured to rotate reversely relative to the lifting base 120, making the first transporting module 21 held by the holding component 121 switch from the vertical posture to a horizontal posture, so that the first transporting module 21 can be installed on the ceiling 8 in the horizontal posture, that is, the lengthwise direction of the installed first transporting module 21 is substantially horizontal, as shown in FIG. 2. Specifically, the first transporting module 21 to be installed is placed on the floor in the vertical posture, the automatic guiding vehicle 11 moves to approach the first transporting module 21, the holding component 121 rotates relative to the lifting base 120 until part of or whole of the holding component 121 is positioned diagonally above the automatic guide vehicle 11 or at the side of the automatic guide vehicle 11, so as to hold the first transporting module 21, dispensing with manual work or the external equipment to load the first transporting module 21 onto the holding assembly 12.

Optionally, referring to FIG. 3 again, the first goods delivery terminal 2 further comprises a plurality of second transporting modules 22, which are used for transporting the goods, and are capable of being joined and installed along a second direction, wherein the second direction may be vertical or intersected with the first direction. Specifically, the plurality of the second transporting modules 22 may be joined and installed from the bottom up, so as to transport the goods between an area near the ceiling 8 and an area near the floor. In the illustrated implementation, the second transporting module 22 is a hollow long structure, and is in the vertical posture after being installed, that is, the lengthwise direction of the installed second transporting module 22 is substantially vertical.

Further, the holding component 121 rotates relative to the lifting base 120, so that the holding component 121 can automatically hold the second transporting module 22 placed on the floor when the holding assembly 12 is near the automatic guiding vehicle 11. The second transporting module 22 held by the holding component 121 may be moved to a position directly above the installed second transporting module 22 via the automatic guiding vehicle 11 and the lifting mechanism 13, making those two second transporting modules 22 joined. The operating assembly 14 is further used for enabling and/or disabling fixed connection of the adjacent second transporting modules 22, as shown in FIG. 3. It should be noted that the second transporting module 22 to be installed at the lowest position may be moved first to an installation position on the floor via the first automatic apparatus 1 or manual work.

Figure 4:
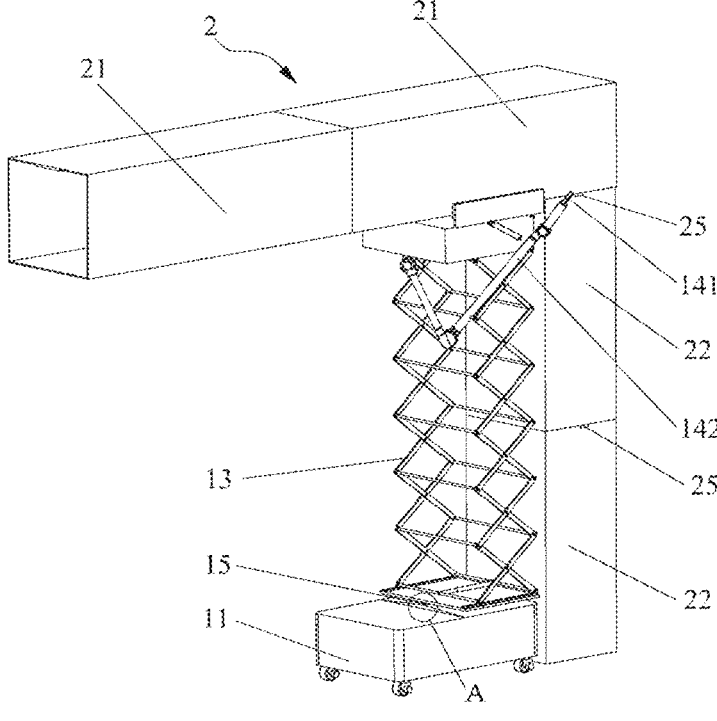
FIG. 4 is a schematic diagram of the first automatic apparatus shown in FIG. 1 enabling fixed connection of the first transporting module and the second transporting module.

Further, referring to FIG. 4, the first transporting module 21 and the second transporting module 22 may be joined, so as to transfer the goods to and from each other. In the illustrated implementation, the installation position of the second transporting module 22 is directly below the first transporting module 21, and the top second transporting module 22 is joined with the first transporting module 21 which is poisoned above the second transporting module 22, correspondingly, the operating assembly 14 is further used for enabling and/or disabling fixed connection of the first transporting module 21 and the second transporting module 22. Wherein, the method for fixedly connecting the adjacent second transporting modules 22 or the method for fixedly connecting the first transporting module 21 and the second transporting module 22 may be substantially the same as the method for fixedly connecting the adjacent first transporting modules 21.

In another implementation, the plurality of the second transporting modules 22 may be joined and installed from the top down, that is, the top second transporting module 22 may be moved first to the installation position via the first automatic apparatus 1, and the operating assembly 14 enables the fixed connection of this second transporting module 22 and the first transporting module 21 which is already arranged on the ceiling 8. Afterwards the first automatic apparatus 1 holds another second transporting module 22 to be installed and moves the second transporting module 22 to a position directly below the installed second transporting module 22, making those two second transporting modules 22 joined; those two second transporting modules 22 may be fixedly connected by the operating assembly 14 or the above-mentioned quick connect structure.

Figure 5:
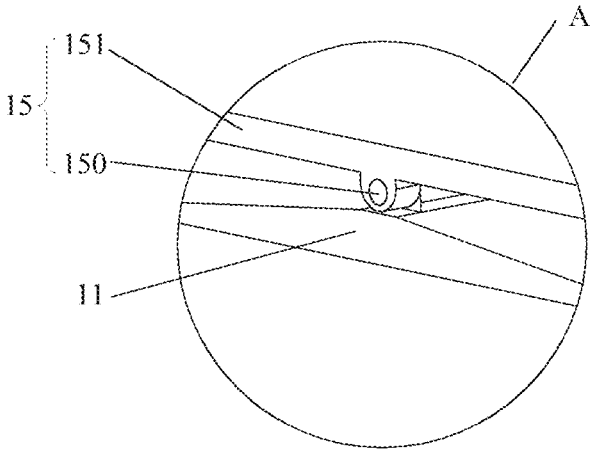
FIG. 5 is an expanded view of the part A in FIG. 4.

Optionally, referring to FIG. 5, the first automatic apparatus 1 further comprises a rotating mechanism 15, which connects the lifting mechanism 13 and the automatic guide vehicle 11. The rotating mechanism 15 is used for driving the lifting mechanism 13 to rotate relative to the automatic guide vehicle 11. In the illustrated implementation, the rotating mechanism 15 comprises a plate 151, the lifting mechanism 13 is arranged on the upper surface of the plate 151, a second rotating shaft 150 is arranged on the lower surface of the plate 151 and is connected with the automatic guiding vehicle 11. Wherein, the second rotating shaft 150 may be arranged along the lengthwise direction of the automatic guided vehicle 11 and may be arranged on middle position of the automatic guided vehicle 11 in widthwise direction of the automatic guided vehicle 11. The top surface, which is opposite to the plate 151, of the automatic guided vehicle 11 is inclined from the middle position of the automatic guided vehicle 11 to two opposite sides of the automatic guided vehicle 11, forming two inclined surfaces, as shown in FIG. 5, allowing the plate 151 to rotate about the second rotating shaft 150 towards either of the two opposite sides of the automatic guided vehicle 11 at a certain angle. The rotating mechanism 15 further comprises an actuator (not shown in the figure) connected with the plate 151, so as to drive the plate 151 to rotate about the second rotating shaft 150.

In the illustrated implementation, since the width of the automated guided vehicle 11 is smaller than the length, and the front or rear portion of the automated guided vehicle 11 may be provided with counterweight, so that the stability in widthwise direction is worse than the stability in lengthwise direction of the first automatic apparatus 1. If the floor on which the automatic guide vehicle 11 is positioned is uneven or unlevel, after the lifting mechanism 13 is extended, the first automated apparatus 1 is prone to roll over in the widthwise direction. The lifting mechanism 13 rotates relative to the automatic guiding vehicle 11 via the rotating mechanism 15, thus decreasing or even eliminating the lateral inclination of the lifting mechanism 13 and preventing the first automatic apparatus 1 from rolling over, so that the first automatic apparatus 1 may be provided without legs used for improving stability, thereby a step of extending/retracting the legs may be omitted, which helps improving installation efficiency of the first automatic apparatus 1 in a process that the first automatic apparatus 1 continuously installs the plurality of the first transporting modules 21 or the second transporting modules 22.

Further, in the case that the floor is uneven or unlevel, the first automatic apparatus 1 may adjust the first transporting module 21 or the second transporting module 22 held by the holding component 121 to a proper attitude for installation via the actuating mechanism 122 and the rotating mechanism 15. Optionally, the holding component 121 is provided with an attitude sensor, which may form closed-loop control system with the actuating mechanism 122, the rotating mechanism 15, and a controller of the first automatic apparatus 1, enabling the first automatic apparatus 1 to automatically adjust the module held by the holding component 121 to the proper attitude for installation.

Optionally, referring to FIG. 1 and FIG. 2 again, the first transporting module 21 and/or the second transporting module 22 is provided with a label 23, correspondingly, the first automatic apparatus 1 further comprises a reading component 16, which may read information from the label 23, so as to recognize identity of the module. The label 23 may be a RFID label or a QR label, correspondingly, the reading component 16 is a RFID reader or an image sensor.

In one implementation, each module of the first goods delivery terminal 2 should be installed in a preset order. In the case that the module which is loaded to the first automatic apparatus 1 by manual work or the external equipment does not follow the preset order, the first automatic apparatus 1 may stop installing the module by recognizing the identity of the module. Specifically, the first automatic apparatus 1 or a device networked with the first automatic apparatus 1 checks whether the module to be installed follows the preset order by recognizing the identity of the module, in the case that result is wrong, the first automatic apparatus 1 stops holding or installing the module. Alternatively, before holding the first transporting module 21 or the second transporting module 22, the first automatic apparatus 1 reads the label 23 of the module and checks whether the module to be installed follows the preset order, on the condition that the result is right, the first automatic apparatus 1 automatically holds the module.

In another implementation, the first automatic apparatus 1 can execute an installation program matched with the module according to the identity of the module. Specifically, different installation programs corresponding to different structures of the module are preset in the first automatic apparatus 1. For example, in the different installation programs corresponding to the different first transporting modules 21, numbers and positions of the mounting points on the ceiling 8 which are determined by the first automatic apparatus 1 may be different. The first automatic apparatus 1 or the device networked with the first automatic apparatus 1 chooses the installation program according to the identity of the module, so that the first automatic apparatus 1 can automatically execute the installation program matched with the module.

Optionally, the operating unit 141 is further used for disabling the fixed connection of the modules, which belong to the installed the first goods delivery terminal 2, enabling the first automatic apparatus 1 to automatically dismantle the module from the installed first goods delivery terminal 2. Alternatively, the operating unit 141 is provided with another type used for implementing at least one operation in cleaning, inspection and repairment, enabling the first automatic apparatus 1 to carry out maintenance work for the installed first goods delivery terminal 2.

Embodiment 2

Figure 6:
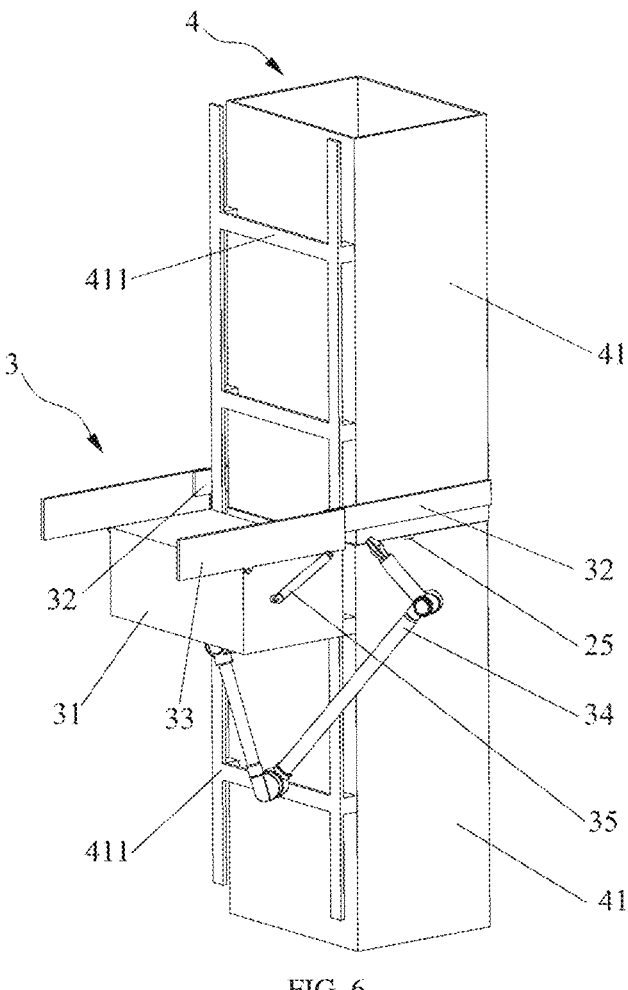
FIG. 6 is a schematic diagram of a second automatic apparatus enabling fixed connection of adjacent third transporting modules according to Embodiment 2 of the present disclosure.
Figure 7:
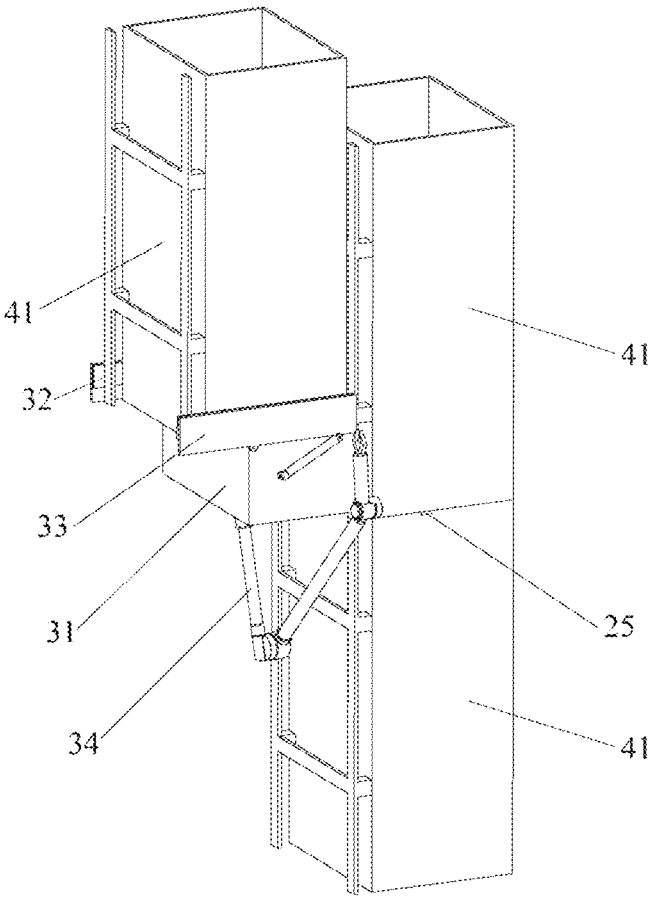
FIG. 7 is a schematic diagram of the second automatic apparatus shown in FIG. 6 holding the third transporting module and sliding along a first rail.

Referring to FIG. 6 and FIG. 7, a second automatic apparatus 3 is used for installing a second goods delivery terminal 4 applied in intelligent logistics, the second goods delivery terminal 4 comprises a plurality of third transporting modules 41 used for transporting the goods, which are capable of being joined and installed from the bottom up. In one implementation, the second goods delivery terminal 4 may be arranged on the exterior wall of a multi-storey building, so as to transport the goods between an area near the ground and an area near the top portion of the building. The second goods delivery terminal 4 may also serve for the UAV to load/offload the goods on the top portion of the second goods delivery terminal 4. If the plurality of the third transporting modules 41 are joined and installed by manual work, it is necessary to erect scaffolds for the worker or to use large lifting equipment, which requires long installation period and high cost, especially for mass deployment of the second goods delivery terminals 4.

The second automatic apparatus 3 comprises a sliding assembly 31, a holding component 32, a moving mechanism 33 and an operating assembly 34. The third transporting module 41 is provided with a first guide rail 411, the first guide rails 411 of the adjacent third transporting modules 41 which are joined and installed may be connected. After a plurality of the third transporting modules 41 are joined and installed, the sliding assembly 31 can slide upwards or downwards along the first guide rails 411 of the plurality of the third transporting modules 41 from a side of one of the third transporting modules 41 to a side of another of the third transporting modules 4, that is, the sliding assembly 31 may be positioned at the side of the installed third transporting module 41 and may autonomously slide up or down along the first guide rail 411 of the third transporting module 41. At least part of the holding component 32 is capable of being positioned above the sliding assembly 31, and the holding component 32 is used for holding the third transporting module 41 to be installed. The moving mechanism 33 is arranged on the sliding assembly 31, and the holding component 32 is configured to be moved by the moving mechanism 33. After the sliding assembly 31 slides to a position at or near the top portion of the installed third transporting module 41, the moving mechanism 33 is used for moving the third transporting module 41 to be installed to a position directly above the installed third transporting module 41. The operating assembly 34 is arranged on the sliding assembly 31 or on the moving mechanism 33 or on the holding component 32, and is used for enabling and/or disabling fixed connection of the adjacent third transporting modules 41.

Specifically, the sliding assembly 31 comprises a guide wheel (not shown in the figure) and an actuator (not shown in the figure), the guide wheel enables the sliding assembly 31 to be attached to the first guide rail 411 and to slide along the first guide rail 411. The actuator can drive the sliding assembly 31 to autonomously slide along the first guide rail 411. The actuator comprises a motor and a gear which is connected with the motor and is driven by the motor, correspondingly, the first guide rail 411 is provided with a gear rack mated with the gear. The actuator is not limited to the above structure, for example, the actuator comprises a traction rope and a rope reel used for automatically winding and unwinding the rope, one end of the traction rope is fixed to the top portion of the installed part of the second goods delivery terminal 4. Additionally, the sliding assembly 31 may further comprises a battery or a cable used for electrically connecting a power source on the ground, so as to supply power to the second automatic apparatus 3.

The holding component 32 is provided with a securing piece used for securing the third transporting module 41 relative to the holding component 32, the securing piece may be substantially the same as the securing piece 1210 of the holding assembly 12 in Embodiment 1. The structure of the third transporting module 41 may be substantially the same as that of the second transporting module 22. In the illustrated implementation, the holding component 32 is a pair of oppositely arranged cantilevers, which are arranged above the sliding assembly 31; the moving mechanism 33 is arranged at the top of the sliding assembly 31, the cantilevers are movably connected with the moving mechanism 33, so as to move between a position directly above the sliding assembly 31 and a position directly above the installed third transporting module 41. The holding component 32 is not limited to the cantilevers, for example, in another implementation, the moving mechanism 33 and the holding component 32 jointly form a four-bar linkage mechanism, and the holding component 32 is a movable bar.

The structure of the operating assembly 34 and the method of enabling the fixed connection of the adjacent third transfer modules 41 may be the same as that of the operating assembly 14 in Embodiment 1. In the illustrated implementation, one operating assembly 34 is arranged on the bottom of the slide assembly 31. The number of the operating assembly 34 may be more than one, for example, two operating assemblies 34 are respectively arranged at two opposite sides of the sliding assembly 31 or the moving mechanism 33. In another implementation, the operating assembly 34 may be arranged on the moving mechanism 33 or the holding component 32, and may move relative to the sliding assembly 31 by means of the moving mechanism 33.

In one implementation, at least one third transporting module 41 is pre-installed on the ground. Then the second automatic apparatus 3 is arranged on the first guide rail 411 of the third transporting module 41, enabling the second automatic apparatus 3 to slide along the first guide rail 411 between an elevation near the ground and an elevation close to the top portion of the installed third transporting module 41. When the second automatic apparatus 3 is near the ground, the third transporting module 41 to be installed is loaded onto the holding component 32 by the external equipment or manual work. The second automatic apparatus 3 slides upwards until the sliding assembly 31 is near the top portion of the installed third transporting module 41. Afterwards, the holding component 32 moves relative to the sliding assembly 31 via the moving mechanism 33 until the third transporting module 41 held by the holding component 32 is moved from the position directly above the sliding assembly 31 to the position directly above the installed third transporting module 41. At this time, the third transporting module 41 held by the second automatic apparatus 3 is joined with the adjacent third transporting module 41, alternatively, in the case that the third transporting module 41 held by the second automatic apparatus 3 and the adjacent third transporting module 41 are spaced a distance from each other in the vertical direction, the sliding assembly 31 may slide downward to make those two third transporting modules 41 joined. After the operating assembly 34 enables the fixed connection of the third transporting module 41 held by the second automatic apparatus 3 and the adjacent third transporting module 41, the holding component 32 releases the third transporting module 41 and moves back to the position directly above the sliding assembly 31, the sliding assembly 31 slides downwards to approach the ground, so as to receive the next third transporting module 41 to be installed In another implementation, the second automatic apparatus 3 moves the third transporting module 41 to the position directly above the installed third transporting module 41 via the sliding assembly 31 and the moving mechanism 33, making those two third transporting modules 41 fixedly connected. For example, the adjacent third transporting modules 41 of the second goods delivery terminal 4 are fixedly connected by means of the quick connect structure such as the snap-fit joint and the snap-fit groove. Correspondingly, the second automatic apparatus 3 moves the third transporting module 41 held by the holding component 32 to the position directly above the installed third transporting module 41 via the sliding assembly 31 and the moving mechanism 33, meanwhile making the snap-fit joint of one of those two third transporting modules 41 engage with the snap-fit groove of the other, so as to enable the fixed connection of those two third transporting modules. Accordingly, the second automatic apparatus 3 may not comprises the operating assembly 34; alternatively, the operating assembly 34 may be merely used for disabling the fixed connection of the adjacent third transfer modules 41, for example, may be merely used for disengaging the snap-fit joint and the snap-fit groove.

The moving mechanism 33 may not move the holding component 32. In another implementation, after the sliding assembly 31 slides to the position at or near the top portion of the installed third transporting module 41, the holding component 32 releases the third transporting module 41 to be installed; afterwards the moving mechanism 33 moves the third transporting module 41 to be installed to the position directly above the installed third transporting module 41. Wherein, one of the third transporting module 41 to be installed and the adjacent third transporting module 41 is provided with a sliding groove, and the other is provided with a mating structure which mates with the sliding groove, the mating structure may snap into the sliding groove and may slide along the lengthwise direction of the sliding groove, so as to prevent the third transporting module 41 to be installed from moving in other directions in the process of being moved by the moving mechanism 33, which further prevents the third transporting module 41 to be installed from falling. Specifically, the lengthwise direction of the sliding groove is parallel with the direction in which the moving mechanism 33 moves the third transporting module 41 to be installed; the sliding groove and the matching structure are receptively arranged on the top and the bottom of each third transporting module 41; the moving mechanism may be a moving piece capable of pushing and pulling the third transporting module 41 to be installed, or a conveying belt which can bear the third transporting module 41 to be installed, or a roller which is arranged close to the first guide rail 411, or the like.

The second automatic apparatus 3 can automatically stack and install the plurality of the third transporting modules 41 from the bottom up without erecting the scaffolds or using the large lifting equipment, thereby improving the installation efficiency, which helps decreasing period and cost of installing the second goods delivery terminal 4, and helps massively deploying the second goods delivery terminals 4.

Figure 8:
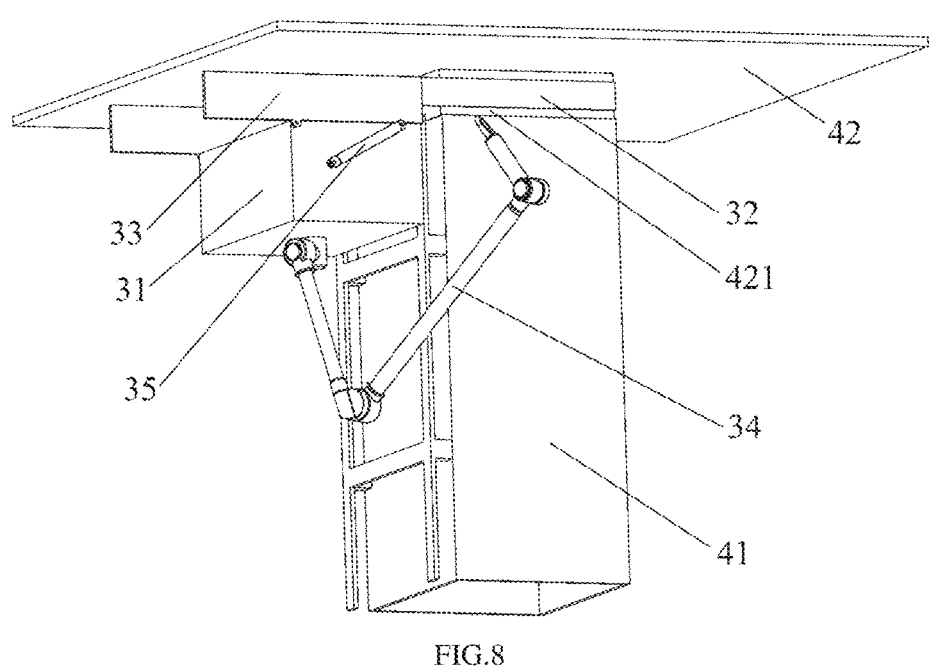
FIG. 8 is a schematic diagram of the second automatic apparatus shown in FIG. 6 enabling fixed connection of a platform module and the third transporting module.
Figure 9:
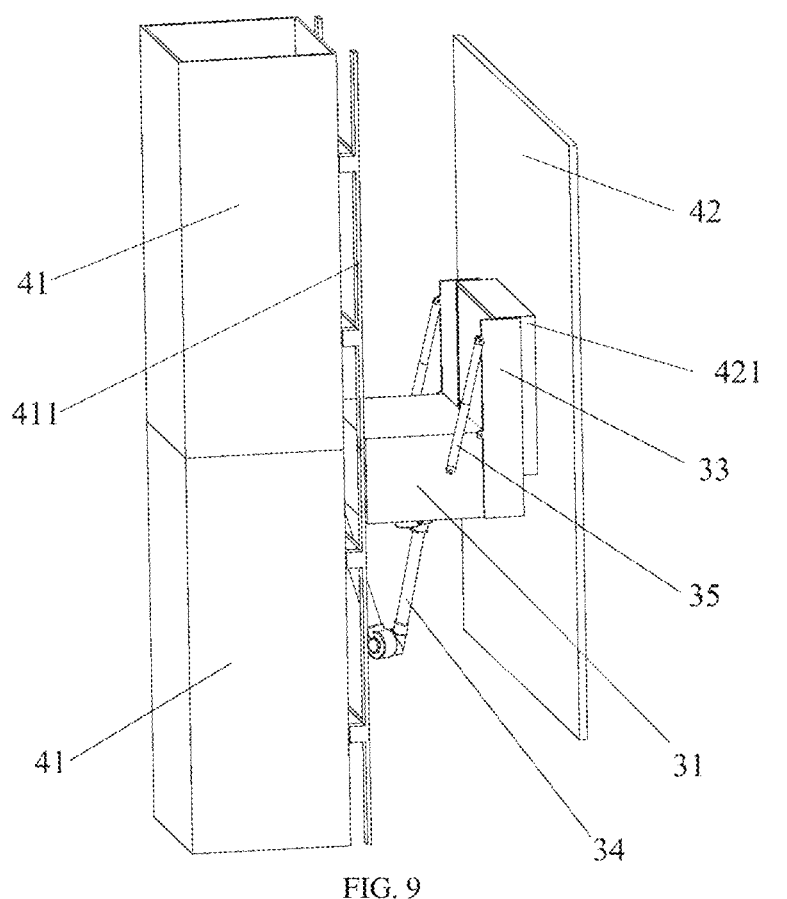
FIG. 9 is a schematic diagram of the second automatic apparatus shown in FIG. 6 holding the platform module and sliding along the first rail.

Referring to FIG. 8 and FIG. 9, the second goods delivery terminal 4 may further comprises a platform module 42 used for the UAV to land and to take off. The platform module 42 is provided with a connecting portion 421 used for being fixedly connected with the third transporting module 41, so that the platform module 42 can be mounted onto the top of the third transporting module 41. The holding component 32 of the second automatic apparatus 3 is further used for holding the platform module 42 to be installed, more specifically, the holding component 32 may hold the platform module 42 via the connecting portion 421.

Further, the holding component 32 may rotate relative to the sliding assembly 31, enabling the platform module 42 held by the holding component 32 to switch between a vertical posture for sliding and a horizontal posture for installation. Wherein, the platform module 42 held by the holding component 32 may be partially or completely positioned at the opposite side of the sliding assembly 31 from the first guide rail 411 when the platform module 42 is in the vertical posture, so as to avoid collision with the first guide rail 411. Specifically, the second automatic apparatus 3 further comprises an actuating mechanism 35 used for driving the holding component 32 to rotate relative to the sliding assembly 31. In the illustrated implementation, the actuating mechanism 35 is a telescopic rod, two ends of the telescopic rod are respectively connected to the sliding assembly 31 and the moving mechanism 33. The telescopic rod extends or contracts, enabling the holding component 32 to rotate relative to the sliding assembly 31. The actuating mechanism 35 is not limited to the telescopic rod, for example, the actuating mechanism 35 may be a motor.

In one implementation, the platform module 42 is provided with a landing surface for the UAV to land on and to take off. After the platform module 42 is installed, as shown in FIG. 8, the platform module 42 is in the horizontal posture, and the landing surface is substantially horizontal, the size of the platform module 42 in the horizontal direction is significantly larger than that in the vertical direction, and is also significantly larger than the size of the installed third transporting module 41 in the horizontal direction. When the platform module 42 is in the vertical posture, as shown in FIG. 9, the landing surface is substantially vertical. The holding component 32 rotates relative to the sliding assembly 31, so as to hold the platform module 42 in the vertical posture when the second automatic apparatus 3 is near the ground or the bottom portion of installed third transporting module 41. When the sliding assembly 31 reaches or approaches the top portion of the installed third transporting module 41, the holding component 32 rotates reversely relative to the sliding assembly 31, making the platform module 42 held by the holding component 32 switch to the horizontal posture for installation.

Figure 10:
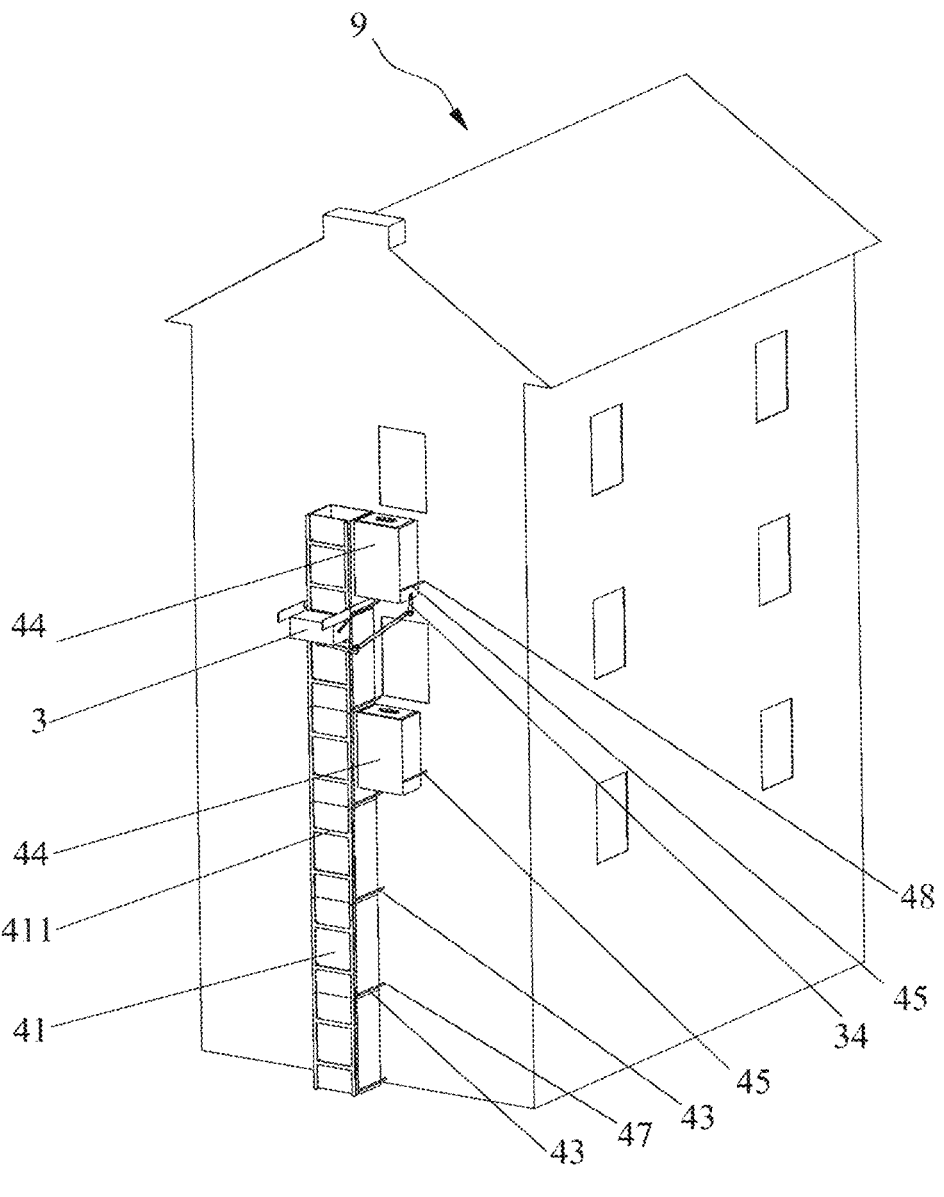
FIG. 10 is a schematic diagram of the second automatic apparatus shown in FIG. 6 enabling fixed connection of a first wall-mount and a building, and enabling fixed connection of a second wall-mount and the building.

Referring to FIG. 10, in the case that the second goods delivery terminal 4 is configured to be arranged on the exterior wall of the building 9, the second goods delivery terminal 4 further comprises a first wall-mount 43 pre-installed on the third transporting module 41, the first wall-mount 43 is used for fixing the third transporting module 41 to the exterior wall of the building 9, and the operating assembly 34 is further used for enabling and/or disabling the fixed connection 47 of the first wall-mount 43 and the building 9. Optionally, the first wall-mount 43 is foldable and is capable of closely approaching a side face of the third transporting module 41, correspondingly, before the first wall-mount 43 is fixed to the building 9, the operating assembly 34 can unfold the first wall-mount 43. It should be noted that the second goods delivery terminal 4 may be independently arranged in an outdoor open field, in this case, the third transporting module 41 may be provided without the first wall-mount 43.

Figure 11:
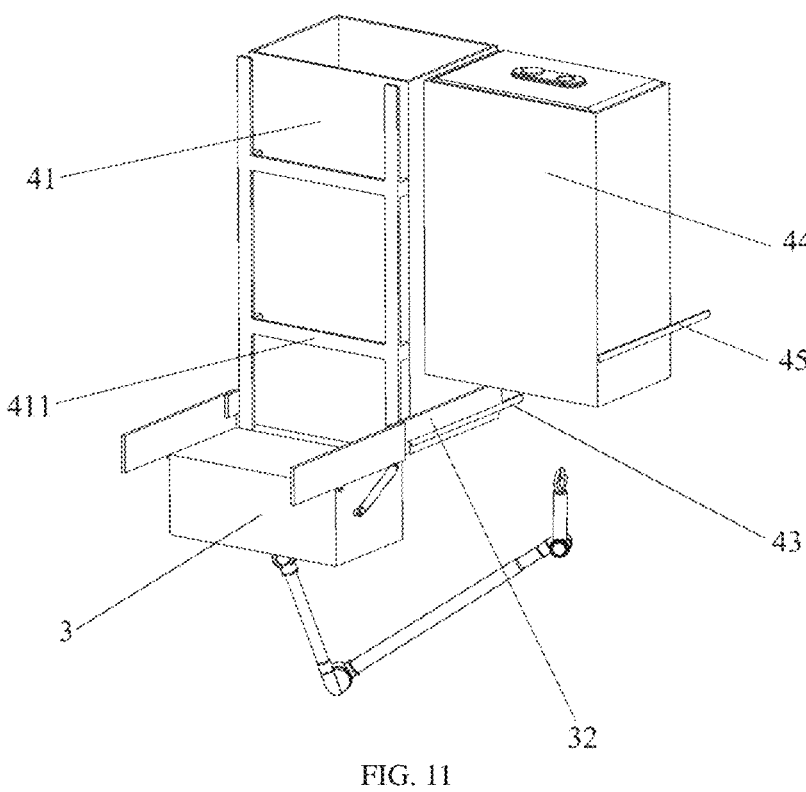
FIG. 11 is a schematic diagram of the second automatic apparatus shown in FIG. 6 holding an assembly of the third transporting module and a storage module.

Further, referring to FIG. 11, the second goods delivery terminal 4 further comprises a storage module 44 used for a user to access the goods, the third transporting module 41 can move the goods into and out of the storage module 44. Wherein, the storage module 44 is configured to be arranged at a side of the third transporting module 41, the third transporting module 41 and the storage module 44 may be pre-assembled. After the third transporting module 41 is arranged on the exterior wall of the building 9, the storage module 44 is arranged adjacent to a communicating portion of the building 9 such as a windowsill or a balcony, allowing the user to access the goods when staying in the building. Correspondingly, the holding component 32 can hold an assembly of the third transporting module 41 and the storage module 44. In the illustrated implementation, when the holding component 32 holds the assembly of the third transporting module 41 and the storage module 44, the bottom of the storage module 44 in the assembly is higher than the bottom of the third transporting module 41 in the assembly, and the holding component 32 is at an elevation between the bottom of the storage module 44 and the bottom of the third transporting module 41, as shown in FIG. 11. Additionally, the second goods delivery terminal 4 further comprises a second wall-mount 45 pre-installed on the storage module 44, the second wall-mount 45 is used for fixing the storage module 44 to the exterior wall of the building 9, and the operating assembly 34 can enable and/or disable fixed connection 48 of the second wall-mount 45 and the building 9. Optionally, the second wall-mount 45 is foldable and is capable of closely approaching a side face of the storage module 44, the second wall-mount 45 may be unfolded by the operating assembly 34.

Figure 12:
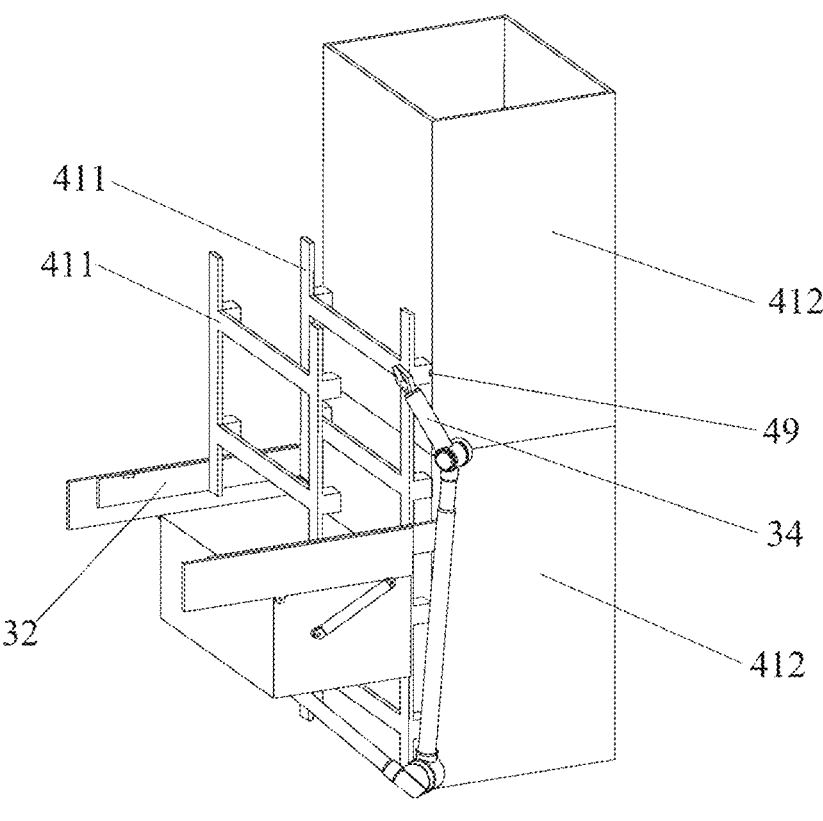
FIG. 12 is a schematic diagram of the second automatic apparatus shown in FIG. 6 enabling fixed connection of the first rail and a support structure.
Figure 13:
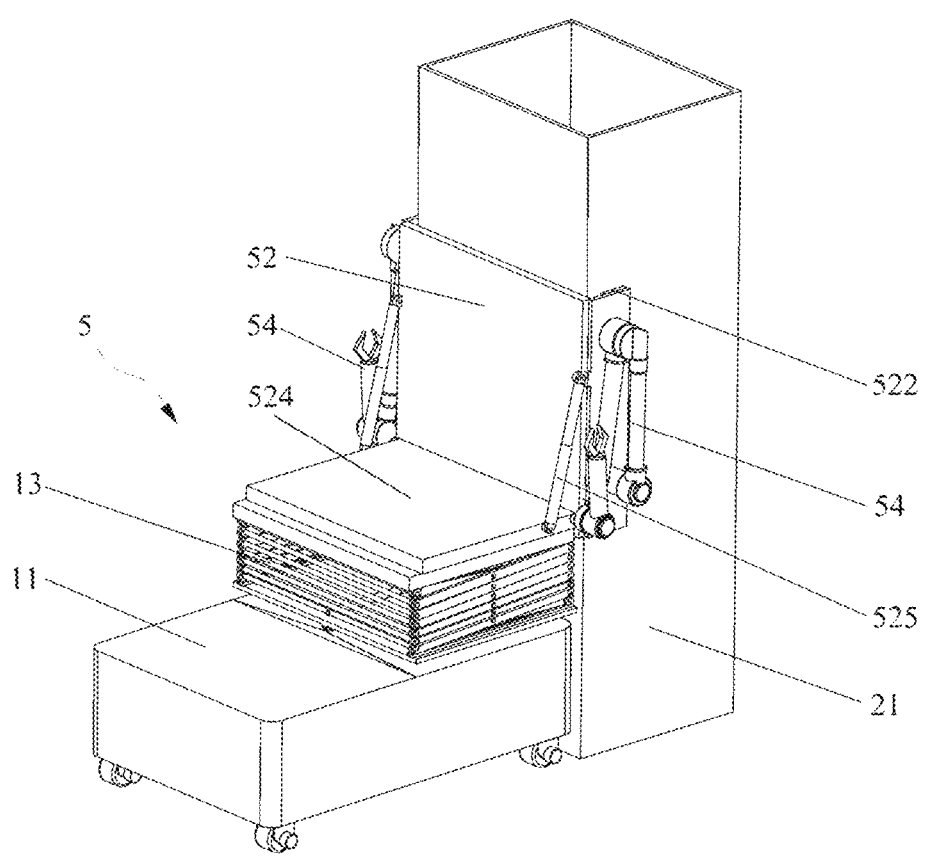
FIG. 13 is a schematic diagram of a first automatic apparatus holding the first transporting module placed in a vertical posture according to Embodiment 3 of the present disclosure.
Figure 14:
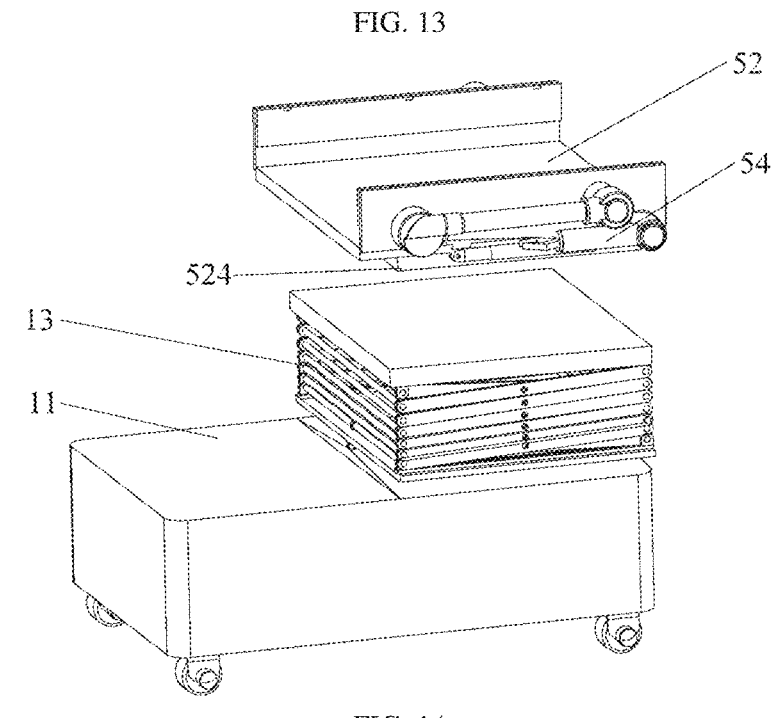
FIG. 14 is a schematic diagram of a holding assembly and an operating assembly being detached from a lifting mechanism of the first automatic apparatus shown in FIG. 13.

Referring to FIG. 12, the third transporting module 41 comprises a support structure 412, the support structure 412 may be a hollow long structure with an opening at each end, a plurality of the support structures 412 are capable of being end to end joined, a second guide rail (not shown in the figure) and a carrying mechanism (not shown in the figure) installed on the second guide rail are both arranged inside the support structure 412. The carrying mechanism can slide up and down along the second guide rail with the goods, enabling the third transporting module 41 to transport the goods. The first guide rail 411 is arranged on the exterior of the support structure 412 and is detachable from the support structure 412.

The holding component 32 is further used for holding the first guide rail 411, and the operating assembly 34 is further used for disabling fixed connection of the first guide rail 411 and the support structure 412, so that the second automatic apparatus 3 can dismantle the first guide rail 411, which is positioned above the sliding assembly 31, from the installed support structure 412, and can transport the first guide rail 411 to the position near the ground or near the bottom portion of the installed third transporting module 41. Optionally, the first guide rail 411 and the support structure 412 are fixedly connected by bolt 49, correspondingly, the operating unit of the operating assembly 34 is used for unscrewing the bolt 49; alternatively, the first guide rail 411 and the support structure 412 are fixedly connected via engagement of a latch and a slot, and the operating unit of the operating assembly 34 is used for disengaging the latch and the slot.

In one implementation, after all the modules of the second goods delivery terminal 4 are installed, the second automatic apparatus 3 dismantles the first guide rails 411 positioned above the sliding assembly 31, one by one, from the top down, and transports the first guide rail 411 to the position near the ground or near the bottom portion of the installed third transporting module 41, afterwards the first guide rail 411 is unloaded from the holding component 32 by manual work or the external equipment, until only the bottom first guide rail 411 is remained. After the second automatic apparatus 3 is removed from the first guide rail 411, the remained first guide rail 411 may be dismantled by manual work or the external equipment. The dismantled first guide rails 411 may be re-used for installation of another second goods delivery terminal 4.

The first guide rail 411 and the support structure 412 may be pre-assembled. Alternatively, the operating assembly 34 is further used for enabling the fixed connection of the first guide rail 411 and the support structure 412, accordingly, the second automatic apparatus 3 may install the support structure 412 first, and subsequently install the first guide rail 411 on the support structure 412. Specifically, the second automatic apparatus 3 may install one support structure 412 and subsequently enable the fixed connection of the first guide rail 411 and this support structure 412, the plurality of the support structures 412 and the first guide rails 411 may be installed by repeating the above process.

In the illustrated implementation, the holding component 32 comprises at least two groups of securing pieces, each group of securing pieces is used for securing one first guide rail 411, so that the second automatic apparatus 3 can continuously dismantle a plurality of the first guide rails 411 from the support structure 412, and can transport the plurality of the dismantled first guide rails 411 to the position near the ground or near the bottom portion of the installed third transporting module 41 at one time, alternatively, the second automatic apparatus 3 can receive a plurality of the first guide rails 411 at one time when being positioned near the ground or near the bottom portion of the installed third transporting module 41, and can continuously install the plurality of the first guide rails 411 on the support structure 412, so as to improve the efficiency that the second automatic apparatus 3 installs or dismantles the first guide rails 411. Optionally, the groups of securing pieces are distributed along the direction in which the holding component 32 or the moving mechanism 35 moves relative to the sliding assembly 31.

In another implementation, the first guide rail 411 is non-detachable from the support structure 412, alternatively, after the second goods delivery terminal 4 is installed, the first guide rail 411 is retained. After the second automatic apparatus 3 is dismantled from the first guide rail 411, the above-mentioned carrying mechanism may be installed on the first guide rail 411, in order to slide up and down relative to the first guide rail 411 with the goods, in this case, the support structure 412 may be provided without the second guide rail, and the support structure 412 may not be the hollow long structure with the opening at each end.

Optionally, the module of the second goods delivery terminal 4, such as the third transporting module 41 and/or the platform module 42, is provided with the label, correspondingly, the second automatic apparatus 3 further comprises a reading component, the working method of the reading component is substantially the same as the reading component 16 of the first automatic apparatus 1 in Embodiment 1.

Optionally, the operating unit of the operating assembly 34 is further used for disabling the fixed connection of the modules, which belongs to the installed second goods delivery terminal 4, enabling the second automatic apparatus 3 to automatically dismantle the module from the installed second goods delivery terminal 4. Alternatively, the operating unit of the operating assembly 34 is provided with another type used for implementing at least one operation in cleaning, inspection and repairment, enabling the second automatic apparatus 3 to carry out maintenance work for the installed second goods delivery terminal 4.

Embodiment 3

Referring to FIG. 13 to FIG. 16, the present embodiment provides another first automatic apparatus 5 and another second automatic apparatus 7. The structure of the first automatic apparatus 5 is substantially the same as that of the first automatic apparatus 1 in Embodiment 1, enabling the first automatic apparatus 5 to install the first goods delivery terminal 2; the structure of the second automatic apparatus 7 is substantially the same as that of the second automatic apparatus 3 in Embodiment 2, enabling the second automatic apparatus 7 to install the second goods delivery terminal 4. The difference is as follows: the holding assembly 52 and the operating assembly 54 of the first automatic apparatus 5 may be detached from the lifting mechanism 13, and may be assembled with the sliding assembly 71 to form the second automatic apparatus 7. The holding assembly 52 comprises a holding component 522, a mounting base 524, and a moving mechanism 523 arranged on the mounting base 524. The mounting base 524 is used for being detachably connected with the sliding assembly 71, enabling the holding assembly 52 and the operating assembly 54 to be detachably mounted on the sliding assembly 71; and the mounting base 524 is further used for being detachably connected with the lifting mechanism 13, enabling the holding assembly 52 and the operating assembly 54 to be detachably mounted on the lifting mechanism 13. The working methods of the sliding assembly 71, the holding component 522 and the moving mechanism 523 are respectively substantially the same as those of the sliding assembly 31, the holding component 32 and the moving mechanism 33 in Embodiment 2. It should be noted that the holding assembly 52 may not comprise the lifting base 120, the lifting base 120 may be part of the lifting mechanism 13, or the mounting base 524 may serve as the lifting base 120. The holding assembly 52 may not comprise the moving mechanism 523, in this case, the moving mechanism 523 is arranged on the sliding assembly 71 and is not shared by the second automatic apparatus 7 with the first automatic apparatus 5.

The first automatic apparatus 5 and the second automatic apparatus 7 share the holding assembly 52 and the operating assembly 54, which helps lowering the overall cost of developing, manufacturing and utilizing those two types of automatic apparatuses.

Optionally, the holding component 522 can rotate relative to the lifting mechanism 13 or the sliding assembly 71. Specifically, the holding assembly 52 further comprises an actuating mechanism 525. When the holding assembly 52 is arranged on the lifting mechanism 13 to serve as a part of the first automatic apparatus 5, the working method of the actuating mechanism 525 is substantially the same as the actuating mechanism 122 of the first automatic apparatus 1; when the holding assembly 52 is arranged on the sliding assembly 71 to serve as a part of the second automatic apparatus 7, the working method of the actuating mechanism 525 is substantially the same as the actuating mechanism 35 of the second automatic apparatus 3.

Figure 15:
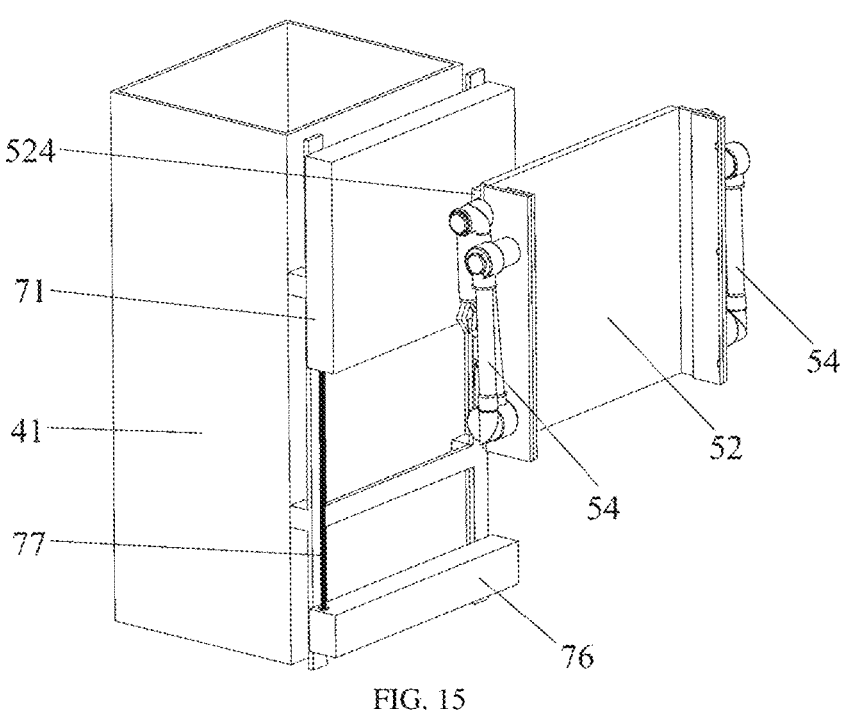
FIG. 15 is a schematic diagram of the holding assembly and the operating assembly being detached from a sliding assembly of a second automatic apparatus according to Embodiment 3 of the present disclosure.
Figure 16:
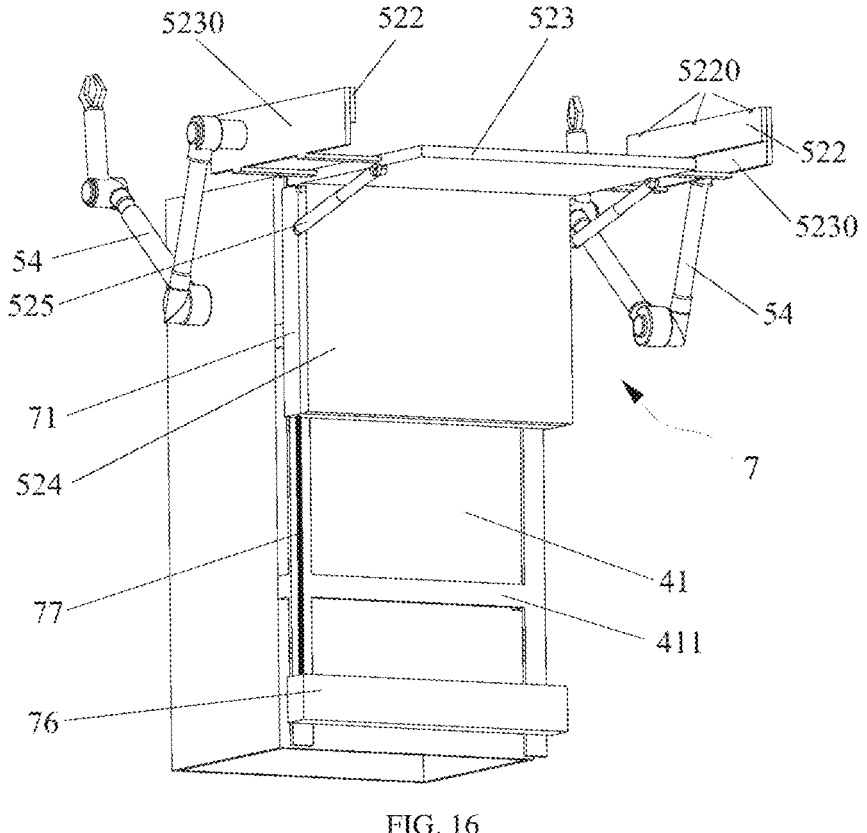
FIG. 16 is a schematic diagram of the second automatic apparatus shown in FIG. 15 installed on the first rail, wherein the moving pieces moves far away from each other.

Further, the holding component 522 and the operating assembly 54 may rotate when being arranged on the sliding assembly 71, enabling the far end of the holding component 522 away from the rotation axis and the far end of the operating assembly 54 away from the rotation axis to move closer to the sliding assembly 71, thereby decreasing the size of the second automatic apparatus 7, as shown in FIG. 15, which facilitates storage and transportation of the second automatic apparatus 7 after the second automatic apparatus 7 is removed from the first guide rail 411. It should be noted that the holding component 32 and the operating assembly 34 of the second automatic apparatus 3 in Embodiment 2 may also rotate to enable the far end of the holding component 32 away from the rotation axis and the far end of the operating assembly 34 away from the rotation axis to move closer to the sliding assembly 31, thereby decreasing the size of the second automatic apparatus 3.

Optionally, the holding component 522 comprises at least one pair of oppositely arranged securing pieces 5220 used for jointly securing the module of the first goods delivery terminal 2 or of the second goods delivery terminal 4, wherein the module may be the first transporting module 21 or the second transporting module 22 or the third transporting module 41, and may be positioned between the two securing pieces 5220 when being held. At least two operating assemblies 54 are connected with the moving mechanism 523 or the holding component 522, and are respectively arranged at two opposite sides of the moving mechanism 523. The moving mechanism 523 is further used for adjusting a distance between the two securing pieces 5220 of the holding component 522, enabling the holding component 522 to hold various sizes of modules which belong to the first goods delivery terminal 2 or belong to the second goods delivery terminal 4. The moving mechanism 523 is further used for adjusting a distance between the two operating assemblies 54, enabling the two operating assemblies 54 to be respectively positioned at or to be respectively close to two opposite sides of the module held by the holding component 522. In the illustrated implementation, the moving mechanism 523 comprises a pair of moving pieces 5230 capable of moving far away from or close to each other, at least one securing piece 5220 and at least one operating assembly 54 is arranged on each moving piece 5230; the securing piece 5220 is fixedly arranged on the moving piece 5230, alternatively, the securing piece 5220 is movable relative to the moving piece 5230 on which the securing piece 5220 is arranged, so that the securing pieces 5220 can move the third transporting module 41 jointly held by those securing pieces 5220 to the position directly above the installed third transporting module 41. It should be noted that the first automatic apparatus 1 in Embodiment 1 and the second automatic apparatus 3 in Embodiment 2 may take the same structures of the holding component 522, the moving mechanism 523 and the operating assembly 54.

Optionally, referring to FIGS. 15 and 16 again, the second automatic apparatus 7 further comprises a power supply assembly 76 and a cable 77. When the sliding assembly 71 slides along the first guide rail 411, the power supply assembly 76 is fixedly arranged on the first guide rail 411, and is closer to the ground compared with the sliding assembly 71. The power supply assembly 76 may be engaged with the sliding assembly 71 and may be separated from the sliding assembly 71. When the power supply assembly 76 is separated from the sliding assembly 71, the power supply assembly 76 may be electrically connected to the sliding assembly 71 via the cable 77, in order to supply power for the sliding assembly 71, so that the sliding assembly 71 may be provided without the battery or the cable connected with the power source on the ground, which helps decreasing the size and the weight of the sliding assembly 71, and keeping the cable 77 close to the first guide rail 411. The power supply assembly 76 is connected to the power source on the ground, or the power supply assembly 76 comprises the battery. The power supply assembly 76 may further comprise a cable reel used for automatically winding and unwinding the cable 77. Further, the cable 77 may be used for transferring data; the power supply assembly 76 may also protect the sliding assembly 71 from falling directly onto the ground due to malfunction of the sliding assembly 71. When the power supply assembly 76 is engaged with the sliding assembly 71, the power supply assembly 76 and the sliding assembly 71 may be installed on or dismantled from the first guide rail 411 as a whole, which helps improving efficiency of installing or dismantling the second automatic apparatus 7, and facilitates storage and transportation of the second automatic apparatus 7 as a whole. It should be noted that the second automatic apparatus 3 in Embodiment 2 may be provided with the same power supply assembly 76 and same cable 77.

Further, the power supply assembly 76 further comprises a locking mechanism (not shown in the figure) used for securing the engagement with the sliding assembly 71. After the second automatic apparatus 7 is installed on the first guide rail 411, the locking mechanism releases the sliding assembly 71, and the sliding assembly 71 slides upwards and moves away from the power supply assembly 76. Before the second automatic apparatus 7 is removed from the first guide rail 411, the sliding assembly 71 slides downwards until the sliding assembly 71 is engaged with the power supply assembly 76, and the locking mechanism secures the engagement with the sliding assembly 71.

The technical features of the above-mentioned embodiments can be combined. In order to simplify the description, not all possible combinations of the technical features of the above-mentioned embodiments have been provided. It can be appreciated that, as long as no contradiction is concluded from these combinations, all reasonable combinations of the features should be considered as the scope recorded in the description.

The present disclosure mainly presents several embodiments with their descriptions more specific and detailed than others, but they should not be construed as limiting the scope of the present disclosure. It should be noted that for persons skilled in the art, several modifications and improvements can be made without departing from the conception of the present disclosure, which shall all fall within the scope of the present disclosure. Therefore, the scope of the present disclosure shall be subject to the appended claims.

The invention claimed is:

1. A second automatic apparatus used for installing a second goods delivery terminal, the second goods delivery terminal comprising a plurality of third transporting modules used for transporting goods, which are capable of being joined and installed from the bottom up, the third transporting module is provided with a first guide rail; wherein
    the second automatic apparatus comprises a sliding assembly; after a plurality of the third transporting modules are joined and installed, the sliding assembly is configured to slide upwards or downwards along the first guide rails of the plurality of the third transporting modules from a side of one of the third transporting modules to a side of another of the third transporting modules; the second automatic apparatus further comprises a holding component, a moving mechanism arranged on the sliding assembly, and an operating assembly arranged on the sliding assembly or on the holding component or on the moving mechanism; and
    at least part of the holding component is capable of being positioned above the sliding assembly, and the holding component is configured to hold the third transporting module to be installed; after the sliding assembly slides to a position at or near the top portion of the installed third transporting module, the moving mechanism is configured to move the third transporting module to be installed to a position directly above the installed third transporting module; the operating assembly is configured to enable and/or disable fixed connection of the adjacent third transporting modules.

2. The second automatic apparatus of claim 1, wherein the moving mechanism is configured to move the holding component; after the sliding assembly slides to the position at or near the top portion of the installed third transporting module, the holding component is configured to move relative to the sliding assembly via the moving mechanism until the third transporting module held by the holding component is moved to the position directly above the installed third transporting module, the operating assembly is configured to enable the fixed connection of the third transporting module held by the holding component and the adjacent third transporting module; or
    the moving mechanism is configured to not move the holding component; after the sliding assembly slides to the position at or near the top portion of the installed third transporting module, the holding component is configured to release the third transporting module to be installed, afterwards the moving mechanism is configured to move the third transporting module to be installed to the position directly above the installed third transporting module.

3. The second automatic apparatus of claim 1, wherein the second goods delivery terminal further comprises a platform module used for a UAV to land and to take off, the holding component is further configured to hold the platform module to be installed; the holding component is configured to rotate relative to the sliding assembly, enabling the platform module held by the holding component to switch between a vertical posture for sliding and a horizontal posture for installation; the platform module held by the holding component is configured to be partially or completely positioned at the opposite side of the sliding assembly from the first guide rail when being in the vertical posture, so as to avoid collision with the first guide rail.

4. The second automatic apparatus of claim 3, wherein the second automatic apparatus further comprises an actuating mechanism configured to drive the holding component to rotate relative to the sliding assembly; and/or
    the holding component and the operating assembly are configured to rotate, enabling the far end of the holding component away from the rotation axis and the far end of the operating assembly away from the rotation axis to move closer to the sliding assembly, facilitating storage and transportation of the second automatic apparatus after the second automatic apparatus is removed from the first guide rail; and/or
    the platform module is provided with a connecting portion used for being fixedly connected with the third transporting module, enabling the platform module to be mounted onto the top of the third transporting module; the holding component is configured to hold the platform module via the connecting portion.

5. The second automatic apparatus of claim 1, wherein the holding component comprises at least one pair of oppositely arranged securing pieces configured to jointly secure the third transporting module; at least two operating assemblies are connected with the moving mechanism or the holding component, and are respectively arranged at two opposite sides of the moving mechanism;
    the moving mechanism is further configured to adjust a distance between the two securing pieces of the holding component, enabling the holding component to hold various sizes of modules which belong to the second goods delivery terminal;
    the moving mechanism is further configured to adjust a distance between the two operating assemblies, enabling the two operating assemblies to be respectively positioned at or to be respectively close to two opposite sides of the module held by the holding component.

6. The second automatic apparatus of claim 5, wherein the moving mechanism comprises a pair of moving pieces configured to move far away from or close to each other, at least one securing piece and at least one operating assembly is arranged on each moving piece;
    the securing piece is fixedly arranged on the moving piece; or, the securing piece is movable relative to the moving piece on which the securing piece is arranged, enabling the securing pieces to move the third transporting module jointly held by those securing pieces to the position directly above the installed third transporting module.

7. The second automatic apparatus of claim 1, wherein the second goods delivery terminal further comprises a first wall-mount pre-installed on the third transporting module, the first wall-mount is used for fixing the third transporting module to the exterior wall of a building; the operating assembly is further configured to enable and/or disable fixed connection of the first wall-mount and the building; and/or the second goods delivery terminal further comprises a storage module and a second wall-mount pre-installed on the storage module, the second wall-mount is used for fixing the storage module to the exterior wall of the building; the holding component is further configured to hold an assembly of the third transporting module and the storage module, and the operating assembly is further configured to enable and/or disable fixed connection of the second wall-mount and the building.

8. The second automatic apparatus of claim 1, wherein the third transporting module comprises a support structure, the first guide rail is arranged on the exterior of the support structure and is detachable from the support structure; the holding component is further configured to hold the first guide rail;

the operating assembly is further configured to disable fixed connection of the first guide rail and the support structure, enabling the second automatic apparatus to dismantle the first guide rail, which is positioned above the sliding assembly, from the installed support structure, and to transport the first guide rail to a position near the ground or near the bottom portion of the installed third transporting module; and/or, the operating assembly is further configured to enable the fixed connection of the first guide rail and the support structure, enabling the second automatic apparatus to install the support structure first, and to subsequently install the first guide rail on the support structure.

9. The second automatic apparatus of claim 1, further comprising a power supply assembly and a cable, wherein when the sliding assembly slides along the first guide rail, the power supply assembly is fixedly arranged on the first guide rail, and is closer to the ground compared with the sliding assembly; and the power supply assembly is configured to be engaged with the sliding assembly and to be separated from the sliding assembly; when the power supply assembly is separated from the sliding assembly, the power supply assembly is configured to be electrically connected to the sliding assembly via the cable, in order to supply power for the sliding assembly and/or to transfer data to/from the sliding assembly; when the power supply assembly is engaged with the sliding assembly, the power supply assembly and the sliding assembly are configured to be installed on or dismantled from the first guide rail as a whole.

10. The second automatic apparatus of claim 1, wherein the third transporting module is provided with a label, the second automatic apparatus further comprises a reading component, which is configured to read information from the label, so as to recognize identity of the third transporting module, thereby checking whether the third transporting module to be installed follows a preset order or executing an installation program matched with the third transporting module according to the identity of the third transporting module; and/or the first guide rails of the adjacent third transporting modules which are joined and installed are configured to be connected; and/or the third transporting module comprises a support structure, the first guide rail and the support structure are pre-assembled; and/or after the sliding assembly slides to the position at or near the top portion of the installed third transporting module, the holding component is configured to move relative to the sliding assembly via the moving mechanism until the third transporting module held by the holding component is moved from a position directly above the sliding assembly to the position directly above the installed third transporting module.

11. The second automatic apparatus of claim 1, wherein the operating assembly comprises an operating unit and a robotic arm; the operating unit is configured to implement at least one operation in drilling a hole, installing screw, spraying adhesive, acting force on an action piece of a quick connect structure, cleaning, inspection and repairment; the robotic arm is configured to enable the operating unit to move.

12. A first automatic apparatus used for installing a first goods delivery terminal, the first goods delivery terminal comprising at least one first transporting module used for transporting goods and capable of being arranged on ceiling; wherein the first automatic apparatus comprises an automated guided vehicle, a holding assembly, a lifting mechanism and an operating assembly; at least part of the holding assembly is configured to be positioned directly above the automatic guide vehicle, and the holding assembly is configured to hold the first transporting module to be installed; the lifting mechanism connects the automatic guide vehicle and the holding assembly; the lifting mechanism is configured to lift the holding assembly up and down relative to the automatic guide vehicle, so as to lift the first transporting module held by the holding assembly up until the first transporting module is near or touching the ceiling, and to lift the holding assembly down until the holding assembly is near the automatic guide vehicle respectively; the first automatic apparatus is configured to move the first transporting module held by the holding assembly to an installation position via the automatic guide vehicle and the lifting mechanism; the operating assembly is arranged on the holding assembly; and the first automatic apparatus is configured to share the holding assembly and the operating assembly with the second automatic apparatus of claim 1; the holding assembly and the operating assembly are configured to be detached from the lifting mechanism, and to be assembled with the sliding assembly to form the second automatic apparatus; the holding assembly comprises the holding component and a mounting base; the holding component is further configured to hold the first transporting module; the mounting base is configured to be detachably connected with the sliding assembly, enabling the holding assembly and the operating assembly to be detachably mounted on the sliding assembly; and the mounting base is further configured to be detachably connected with the lifting mechanism, enabling the holding assembly and the operating assembly to be detachably mounted on the lifting mechanism; and the operating assembly is configured to enable and/or disable fixed connection of the first transporting module and the ceiling when being arranged on the lifting mechanism; and the operating assembly is configured to enable and/or disable the fixed connection of the adjacent third transporting modules when being arranged on the sliding assembly.

13. The first automatic apparatus of claim 12, wherein
the first goods delivery terminal comprises a plurality of
first transporting modules, the first automatic apparatus
is configured to install the plurality of the first trans-
porting modules along a first direction onto the ceiling
with joining those first transporting modules; and
after the plurality of the first transporting modules are
fixed to the ceiling, the operating assembly is further
configured to enable fixed connection of the adjacent
ones of the first transporting modules; or, before fixing
the first transporting module held by the holding assem-
bly to the ceiling, the operating assembly is configured
to enable the fixed connection of this first transporting
module and another first transporting module which is
already installed on the ceiling.

14. The first automatic apparatus of claim 12, wherein
the holding assembly further comprises the moving
mechanism, the moving mechanism is arranged on the
mounting base; or
the holding assembly is provided without the moving
mechanism, the moving mechanism is arranged on the
sliding assembly and is not shared by the second
automatic apparatus with the first automatic apparatus.

15. The first automatic apparatus of claim 14, wherein
the holding component comprises at least one pair of
oppositely arranged securing pieces configured to
jointly secure the first transporting module; at least two
operating assemblies are connected with the moving
mechanism or the holding component, and are respec-
tively arranged at two opposite sides of the moving
mechanism;
the moving mechanism is further configured to adjust a
distance between the two securing pieces of the holding
component, enabling the holding component to hold
various sizes of modules which belong to the first
goods delivery terminal;
the moving mechanism is further configured to adjust a
distance between the two operating assemblies,
enabling the two operating assemblies to be respec-
tively positioned at or to be respectively close to two
opposite sides of the module held by the holding
component.

16. The first automatic apparatus of claim 15, wherein
the moving mechanism comprises a pair of moving pieces
configured to move far away from or close to each
other, at least one securing piece and at least one
operating assembly is arranged on each moving piece;
the securing piece is fixedly arranged on the moving
piece; or, the securing piece is movable relative to the
moving piece on which the securing piece is arranged.

17. The first automatic apparatus of claim 12, wherein
the holding component is configured to rotate relative to
the mounting base, enabling the holding component to
be partially or completely positioned diagonally above
the automatic guide vehicle or at a side of the automatic
guide vehicle after rotation.

18. The first automatic apparatus of claim 17, wherein
the holding component is configured to rotate relative to
the mounting base, enabling the holding component to
automatically hold the first transporting module, which
is placed on the floor and is in a vertical posture, when
the holding assembly is near the automatic guiding
vehicle;
after the holding component holds the first transporting
module, the holding component is configured to rotate
reversely relative to the mounting base, making the first
transporting module held by the holding component
switch from the vertical posture to a horizontal posture,
enabling the first transporting module to be installed on
the ceiling in the horizontal posture; and/or
the holding component is configured to rotate about a first
rotating shaft relative to the mounting base, and the first
rotating shaft is arranged along the widthwise direction
of the automatic guide vehicle; the holding assembly
further comprises an actuating mechanism configured
to drive the holding component to rotate relative to the
mounting base.

19. The first automatic apparatus of claim 17, wherein
the first goods delivery terminal comprises a plurality of
first transporting modules which are capable of being
joined and installed along a first direction onto the
ceiling; the first goods delivery terminal further com-
prises a plurality of second transporting modules,
which are used for transporting the goods, and are
capable of being joined and installed along a second
direction, the second direction intersects with the first
direction;
the holding component is configured to rotate relative to
the mounting base, enabling the holding component to
automatically hold the second transporting module
placed on the floor when the holding assembly is near
the automatic guiding vehicle.

20. The first automatic apparatus of claim 19, wherein
the second transporting module held by the holding
component is configured to be moved to a position
directly above or directly below the installed second
transporting module via the automatic guiding vehicle
and the lifting mechanism, the operating assembly is
further configured to enable and/or disable fixed con-
nection of the adjacent second transporting modules.

* * * * *